US011252110B1

(12) United States Patent
Malin et al.

(10) Patent No.: US 11,252,110 B1
(45) Date of Patent: Feb. 15, 2022

(54) NEGOTIATION OF ALIGNMENT MODE FOR OUT OF ORDER PLACEMENT OF DATA IN NETWORK DEVICES

(71) Applicant: Marvell International Ltd., Hamilton (BM)

(72) Inventors: Shai Malin, Tel Aviv (IL); Yoav Galon, Givatayim (IL); Amit Radzi, Tel Aviv (IL)

(73) Assignee: Marvell Asia Pte Ltd, Singapore (SG)

( * ) Notice: Subject to any disclaimer, the term of this patent is extended or adjusted under 35 U.S.C. 154(b) by 207 days.

(21) Appl. No.: 16/577,630

(22) Filed: Sep. 20, 2019

Related U.S. Application Data

(60) Provisional application No. 62/734,915, filed on Sep. 21, 2018, provisional application No. 62/734,909, filed on Sep. 21, 2018.

(51) Int. Cl.
*G06F 13/16* (2006.01)
*H04L 12/861* (2013.01)
*H04L 29/06* (2006.01)
*H04L 12/879* (2013.01)

(52) U.S. Cl.
CPC ........ *H04L 49/9057* (2013.01); *H04L 49/901* (2013.01); *H04L 69/22* (2013.01); *H04L 69/24* (2013.01); *H04L 2212/00* (2013.01)

(58) Field of Classification Search
CPC .................................................... H04L 49/90
See application file for complete search history.

(56) References Cited

U.S. PATENT DOCUMENTS

| | | | |
|---|---|---|---|
| 9,456,384 | B2 | 9/2016 | Cui et al. |
| 10,484,258 | B2 | 11/2019 | Skarve et al. |
| 2004/0083288 | A1 | 4/2004 | Uzrad-Nali et al. |
| 2010/0158015 | A1 | 6/2010 | Wu |
| 2014/0050096 | A1 | 2/2014 | Cui et al. |
| 2017/0187496 | A1 | 6/2017 | Shalev et al. |
| 2017/0187629 | A1 | 6/2017 | Shalev et al. |
| 2017/0331713 | A1 | 11/2017 | Skarve et al. |

(Continued)

OTHER PUBLICATIONS

Grimberg et al., "NVM Express Technical Proposal for New Feature; NVM Express Over Fabrics, Revision 1.0; TP 4028 Transport/ Pathing Related Error Codes" Technical Proposal ID 8000-NVMe/ TCP Transport, dated Nov. 13, 2018 (32 pages).

(Continued)

*Primary Examiner* — Sulaiman Nooristany

(57) ABSTRACT

A first network device transmits, to a second network device, a first indication indicating that the first network device is willing to transmit data to the second network device using an alignment mode for aligning protocol data units (PDUs) that include data with transport packets that encapsulate the PDUs for transmission of the data to the second network device. The first network device receives, from the second network device, a second indication indicating that the second network device is requesting use of the alignment mode for transmission of data from the first network device to the second network device. In response to transmitting the first indication to the second network device and receiving the second indication from the second network device, the first network device enables the alignment mode for transmission of data from the first network device to the second network device.

20 Claims, 8 Drawing Sheets

(56) References Cited

U.S. PATENT DOCUMENTS

| | | |
|---|---|---|
| 2019/0045421 A1 | 2/2019 | Shah et al. |
| 2019/0050273 A1 | 2/2019 | Tamir et al. |
| 2019/0163364 A1 | 5/2019 | Gibb et al. |
| 2019/0188376 A1* | 6/2019 | Marcu .................... G06F 21/552 |
| 2020/0125430 A1 | 4/2020 | Wang et al. |
| 2020/0293465 A1* | 9/2020 | Yang ..................... G06F 3/0635 |

OTHER PUBLICATIONS

U.S. Appl. No. 16/577,545, Malin et al., "Out Of Order Placement of Data in Network Devices," filed Sep. 20, 2019.
U.S. Appl. No. 16/577,625, Stawitzky et al., "Out of Order Packet Buffer Selection," filed Sep. 20, 2019.

* cited by examiner

400

| Command Capsule CID (CCCID) 402 | Transfer Tag (TTAG) 404 | Data Offset (DATAO) 406 | Data Length (DATAL) 408 | Reserved 410 |

| Command Capsule CID (CCCID) 402 | Reserved 454 | Data Offset (DATAO) 406 | Data Length (DATAL) 408 | Reserved 410 |

*FIG. 4B*

NEGOTIATION OF ALIGNMENT MODE FOR OUT OF ORDER PLACEMENT OF DATA IN NETWORK DEVICES

CROSS-REFERENCES TO RELATED APPLICATIONS

This disclosure claims the benefit of U.S. Provisional Patent Application Nos. 62/734,909, entitled "Non-Volatile Memory Express/Transmission Control Protocol (NVMe/TCP) Out of Order Placement," filed on Sep. 21, 2018 and 62/734,915, entitled "Non-Volatile Memory Express/Transmission Control Protocol (NVMe/TCP) Alignment Negotiation for Out of Order (OOO) Placement," filed on Sep. 21, 2018, both of which are hereby incorporated by reference herein in their entireties.

FIELD OF TECHNOLOGY

The present disclosure relates generally to memory devices such as solid state memory devices, and more particularly, to transmission of data to and from memory devices in computer networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Network devices utilize various data transfer protocols to transfer data between a host device, such as a device implementing an application, and a target device, such as a storage box. Such transfers often occur over a network, in which a data transfer protocol may be layered over a transport protocol to perform the data transfer over the network. For example, a non-volatile memory express (NVMe) protocol may be layered over an NVMe over fabrics (NVMeOF) protocol, such as NVMe over transmission control protocol (TCP), to transfer data over a TCP connection on the network. An NVMe/TCP protocol data unit (PDU) that carries data typically includes a header that specifies information that allows a receiving device to determine a final memory location at which the data is to be stored at the receiving device. Thus, when the receiving device is able to locate the header of the NVMe/TCP PDU in a TCP packet, the receiving device is able to write data transmitted in the packet directly to a location in the memory at the final destination based on information carried in the header of the PDU. However, in some situations, TCP packets arrive out of order at the receiving device, for example, due to loss or delay of TCP packets in the network. In such situations, an NVMe/TCP PDU header corresponding to data received in the TCP packet may be located in a lost or delayed TCP packet. In such scenarios the receiving device typically needs to temporarily store OOO TCP packets in an OOO buffer until the missing TCP packet (or packets) is received, and subsequently transfer the data from the OOO buffer to the final memory location in the memory of the receiving device. Some devices rely on a dedicated OOO buffer that necessitate use of a large memory to temporarily store out of order TCP packets, particularly when many TCP connections are supported by the receiving device. Further, transfers of data from the temporary buffers to the final memory destinations increase latency of data transfers and require additional processing bandwidth at the receiving device.

SUMMARY

In an embodiment, a first network device comprises: a memory for storing data associated with one or more data streams one or both of i) received by the first network device and ii) to be transmitted by the first network device, the memory configured to store data associated with a respective data stream in a sequential order within the respective data stream; and a network interface controller having one or more integrated circuits configured to: transmit, to a second network device, a first indication indicating that the first network device is willing to transmit data retrieved from the memory to the second network device using an alignment mode, the alignment mode being for aligning protocol data units (PDUs) that include data retrieved from the memory with transport packets that encapsulate the PDUs for transmission of the data to the second network device, receive, from the second network device, a second indication indicating that the second network device is requesting use of the alignment mode for transmission of data from the first network device to the second network device, in response to transmitting the first indication to the second network device and receiving the second indication from the second network device, enable the alignment mode for transmission of data from the first network device to the second network device, and transmit the data retrieved from the memory to the second network device using the alignment mode.

In another embodiment, a method for alignment mode negotiation includes: transmitting, from a first network device to a second network device, a first indication indicating that the first network device is willing to transmit data to the second network device using an alignment mode, the alignment mode being for aligning protocol data units (PDUs) that include data with transport packets that encapsulate the PDUs for transmission of the data to the second network device; receiving, at the first network device from the second network device, a second indication indicating that the second network device is requesting use of the alignment mode for transmission of data from the first network device to the second network device; in response to transmitting the first indication to the second network device and receiving the second indication from the second network device, enabling the alignment mode for transmission of data from the first network device to the second network device; and transmitting, by the first network device, the data to the second network device using the alignment mode, the data to be written to a memory of the second network device.

BRIEF DESCRIPTION OF THE DRAWINGS

FIGS. 4A-4B are diagrams of example protocol data unit headers of the protocol data unit of FIG. 3, according to an embodiment.

DETAILED DESCRIPTION

Figure 1:
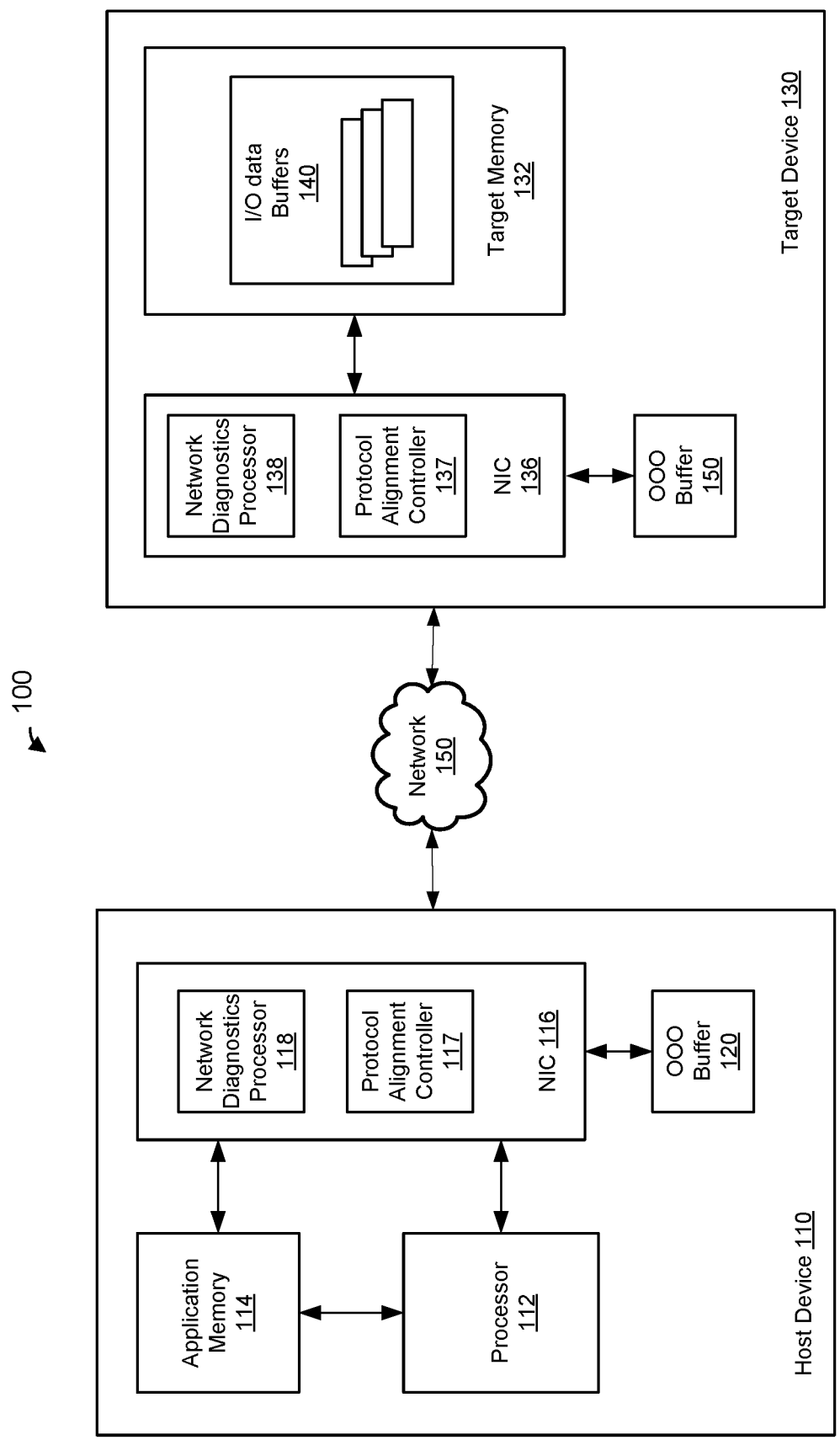
FIG. 1 is a block diagram of an example system that utilizes direct data placement techniques of the present disclosure, according to an embodiment.

In embodiments described below, transfers of data between network devices, such as a host devices and a target device on a network, utilize encapsulation of storage protocol data units (PDUs) that conform to a data storage over fabrics protocol (e.g., a non-volatile memory express (NVMe) over fabrics (NVMeOF) protocol), such as NVMe over transmission control protocol (TCP), in transport packets that conform to a transport protocol, such as the TCP transport protocol. In an embodiment, a transmitting network device (e.g., one of the host device and the target device on the network) is configured to transmit a data stream by encapsulating PDUs including portions of the data stream in a sequence of transport packets transmitted to a receiving network device (e.g., the other one of the host device and the target device on the network). In an embodiment, each PDU includes data a PDU header that includes data placement information for determining memory location for placing the data in a memory of the network device. In an embodiment, each PDU additionally includes header protection information for verifying validity of a received PDU header.

In an embodiment, when transmitting the data stream to the receiving network device, the transmitting network device segments the data stream in a manner that ensures that each transport packet includes one or more complete PDUs including respective portions of the data stream, thereby ensuring that a payload of each transport packet begins with a PDU header of a PDU that includes a portion of the data stream. Such alignment between the PDUs and the transport packets ensures that the receiving device is able to locate a header of a respective PDU in any transport packet independently of any other transport packet that encapsulates another portion of the data stream, and to place the data included in the PDU directly into the memory based on the data placement information in the PDU header of the PDU.

In some embodiments, the receiving device is configured to, prior to processing a PDU header and obtaining data placement information from the PDU header, verify validity of the PDU header using, for example, a cyclic redundancy check (CRC) or another suitable error detection algorithm, based on the header protection information included in the PDU. Verifying validity of the received header based on the header protection information included in a respective PDU allows the receiving device to ensure that alignment between the respective PDU and the transport packet has not be altered, for example due re-segmentation of the data stream by an intermediate device in the network, in an embodiment. Because the receiving device is able to locate a PDU header of a respective PDU in any transport packet independently of any other transport packet that encapsulates another portion of the data stream, and to verify validity of the PDU header based on information included in the respective PDU, the receiving device is able to determine a memory location for placing data included in the respective PDU encapsulated in any transport packet and to place the data directly into the memory of the receiving device, even in situations in which the transport packet is received at the receiving device out of order within the sequence of transport packets used to transmit a data stream to the receiving device, for example, due to a delay or loss of a preceding transport packet in the sequence of transport packets used to transmit the data stream to the receiving device, in an embodiment.

In an embodiment, by using alignment between PDUs and transport packets, the amount of data that needs to be temporarily saved in an out of order (OOO) buffer at the receiving device is eliminated or significantly reduced as compared to conventional systems in which all transport packets received out of order must typically be temporarily stored in an OOO buffer and subsequently copied from the OOO buffer to the memory of the receiving device. As a result, the use of alignment between PDUs and transport packets allows for a smaller OOO buffer to be included in the receiving device or for the OOO buffer to be entirely omitted from the receiving device, in some embodiments. Moreover, the use of alignment between PDUs and transport packets results in a reduction of transactions to and from the memory of the receiving device, reduces the time between the receipt of the missing transport packet and increase of rate of transmission of the transport packets to the receiving device, and reduces processing bandwidth in the receiving device, in at least some embodiments.

In at least some situations, a drawback of using alignment between PDUs and transport packets for transmission of a data stream on the network is an increase of information transmitted in connection with transmission of the data stream because each transport packet must include at least one PDU header that carries information needed for direct placement of the corresponding data in the memory of the receiving device. To efficiently balance between benefits and drawbacks of using alignment between PDUs and transport packets, in an embodiment, network devices are configured to negotiate the use of alignment between PDUs and transport packets by negotiating use of an alignment mode for transmission and/or reception of the data stream over the network. In an embodiment, the use of the alignment mode is negotiated for each connection between a first network device (e.g., the host device) and a second network device (e.g., the target device), and for each direction on each connection between the host device and the target device. Such flexible alignment mode negotiation between the host device and the target device allows for a decision of whether or not alignment mode will be enabled in a particular direction between the host device and the target device to be made, at least in part, at either the host device or the target device. As a result, one or both of the host device and the target device is able to dynamically select, for example based on measurements of lossiness of the network, whether or not alignment mode will be utilized in a particular direction of the connection, in at least some embodiments.

FIG. 1 is a block diagram of an example system 100 in which a first network device 110 and a second network device 130 are communicatively coupled via a communication network 150, according to an embodiment. In an embodiment, the first network device 110 is a host device, such as a processor node, and the first network device 110 is sometimes referred to herein as a "host device 110". In an embodiment, the second network device 130 is a target device (e.g., a storage device, such as a solid state drive (SSD) device), and the second network device 130 is sometimes referred to herein as a "target device 130". In an embodiment, the first network device 110 and the second network device 130 are suitable processor nodes that are communicatively coupled via the communication network 150, in an embodiment. In an embodiment in which the first network device 110 and the second network device 130 are suitable processor nodes that are communicatively coupled via the communication network 150, one or both of the first network 110 and the second network device 130 includes or is coupled to a storage device, such as an SSD device. The communication network 150 (sometimes referred to herein as simply "network 150") is a wide area network (WAN) such as the Internet, a local area network (LAN), or any other suitable type of network or mode of communication, in various embodiments. The network 150 is single network, in an embodiment, or is made up of multiple different networks, in another embodiment. In an embodiment, the network 150 comprises a communication fabric that comprises switches, routers, etc. that connect a set of network devices (e.g., processor nodes), such as an Ethernet fabric, a fiber channel fabric, an Omni-Path fabric, an InfiniBand fabric, or other suitable communication fabric.

With continued reference to FIG. 1, the host device 110 includes a processor 112, an application memory 114 and a network interface controller (NIC) 116, in the illustrated embodiment. The target device 130 includes a target memory 132 and an NIC 136, in the illustrated embodiment. The target memory 132 comprises non-volatile memory configured to persistently store data, in an embodiment. For example, the target memory 132 comprises an SSD device, in an embodiment. In another embodiment, the target memory 132 comprises another suitable type of a non-volatile memory device.

In an embodiment, the system 100 is part of a data center, for example. For example, the host device 110 is a computing device in a data center, and the target device 130 is a data center storage box in the data center, in an embodiment. Although only a single host device 110 is illustrated in FIG. 1, the system 100 includes multiple host devices 110 communicatively coupled to the target device 130 via the communication network 150, in some embodiments. For example, the system 100 is part of a data center that utilizes an aggregated storage architecture in which multiple computing devices (e.g., multiple host devices 110) have access to an aggregated storage device (e.g., the target device 130), in an embodiment. In another embodiment, the system 100 is part of a data center that utilizes disaggregated storage architecture. For example, the system 100 includes multiple network devices communicatively coupled via the communication network 150, where each of the multiple network devices includes computing capabilities of the host device 110 and storage capabilities of the target device 130, in an embodiment. In an embodiment, each network device of the multiple network devices in the system 100 has access to memories of one or more other network devices in the system 100 over the communication network 150.

The NIC 136 of the target device 130 is configured to enable communication between the target device 130 and the host device 110 over the communication network 150. The network interface controller 136 includes one or more integrated circuits (ICs) configured to operate as discussed below. In an embodiment, the NIC 136 is configured to transmit data retrieved from the target memory 132 and to receive data to be written to the target memory 132. In an embodiment, the target memory 132 includes a plurality of input/output (I/O) data buffers 140. In an embodiment, a particular I/O data buffer 140 comprises a set of memory locations associated with a connection between the host device 110 and the target device 132 and is configured to sequentially store data of a data stream being transferred on the connection between the host device 110 and the target device 132.

In an embodiment, the NIC 136 is configured to retrieve a data stream from an I/O data buffer 140 of the target memory 132 via an interface (e.g., peripheral component interconnect (PCI) interface, PCI express (PCIe) interface, or another suitable interface) between the NIC 136 and the target memory 132, and to generate protocol data units (PDUs) to include data of the data stream. The NIC 136 is further configured to generate transport packets to encapsulate the generated PDUs and to transmit the transport packets encapsulating the PDUs over the network 150 to the host device 110, in an embodiment. The NIC 136 is also configured to receive transport packets from the network 150, to de-capsulate PDUs included in the transport packets, and to write data included on the PDUs to the target memory 132 via the interface between the NIC 136 and the target memory 132. In an embodiment, the PDUs generated and/or received by the NIC 136 conform to a data storage over fabric communication protocol, such NVMe/TCP protocol. In an embodiment, the transport packets that the NIC 136 is configured to generate to encapsulate the PDUs conform to a transport protocol supported by the network 150, such as TCP. Although merely for ease of explanation, data transfer techniques are described herein in the context of NVMe/TCP protocol layered over TCP, in other embodiments other suitable data storage communication protocol and/or other suitable transport protocol may be utilized.

In an embodiment, the NIC 136 includes a processor, such as a media access control (MAC) processor (not shown) coupled to the network 150. In an embodiment, the NIC 136 additionally includes one or more offload engines (not shown), such as an NVMe/TCP offload engine and a TCP offload engine configured to perform operations for processing corresponding respective layers of the packets received from the network 150 or to be transmitted on the network 150.

The network interface controller 136 includes a protocol alignment controller 137 and a network diagnostics processor 138, in an embodiment. The protocol alignment controller 137 is configured to align PDUs that conform to the data storage communication protocol, such as NVMe/TCP PDUs, with transport packets that conform to the transport protocol, such as TCP packets, in an embodiment. For example, the protocol alignment controller 137 is configured to ensure that only complete NVMe/TCP PDUs are encapsulated in each TCP packet, thereby ensuring that a respective payload of each TCP packet is aligned with a beginning of a NVMe/TCP PDU. In an embodiment, the protocol alignment controller 137 is configured to segment the data stream retrieved from the target memory 132 for layering over TCP in a manner that ensures that only complete NVMe/TCP PDUs will be encapsulated in each TCP packet (also referred to herein as "TCP segment"), in an embodiment. The protocol alignment controller 137 is also configured to receive PDUs that are aligned with transport packets, and to place data included in the PDUs directly to the target memory 132 based in data placement information included in headers of the PDUs, even when the transport packets are received out of order at the target device 130, in an embodiment.

In an embodiment, the protocol alignment controller 137 is configured to negotiate the use of alignment mode for transmission of one or more data streams from the target device 130 to the host device 110, and to enable the alignment mode for transmission of the one or more data streams only after the use of alignment mode for transmission is negotiated between the host device 110 and the target device 130. Negotiation of the use of alignment mode is based on network diagnostics measurements on the network 150 performed by the network diagnostics processor 138, in an embodiment. Negotiation of the use of alignment mode, according to an embodiment, is described in more detail below in connection with FIG. 5.

In an embodiment, the NIC 136 is coupled to an out of order (OOO) buffer 150. The NIC 136 is configured to temporarily store out of order transport packets in the OOO buffer 150 in some situations, in an embodiment. In an embodiment, an OOO transport packet written to the OOO buffer 120 by the NIC 136 is stored in the OOO buffer 150 until missing transport packet (or missing transport packets) that precede the OOO transport packet in a sequence of transport packets being transmitted to the target device 130 are received by the target device 130. When the missing transport packet (or missing transport packets) are received by the target device 130, the NIC 136 re-assembles the sequence of transport packets in the correct order, identifies final memory locations in the target memory 132 for storing data included in the transport packets, and transfers the data to the determined final memory locations in the target memory 132, in an embodiment. In an embodiment, the NIC 136 is configured to temporarily store out of order transport packets in the OOO buffer 150 for connections for which the alignment mode is not enabled for transmissions by the host device 110, in an embodiment. In some embodiments, the OOO buffer 150 is omitted from the target device 130.

With continued reference to FIG. 1, the network interface controller 116 of the host device 110 is configured to enable communication between the host device 110 and the target device 130 over the communication network 150. The network interface controller 116 includes one or more integrated circuits (ICs) configured to operate as discussed below. In an embodiment, the network interface controller 116 is configured to transmit data to be stored in the target memory 132 of the target device 130 and receive data read from the target memory 132 of the target device 130. In an embodiment, the NIC 116 is configured to receive a data stream from the processor 112 and to generate protocol data units (PDUs) to include data of the data stream. The NIC 116 is further configured to generate transport packets to encapsulate the PDU and to transmit the transport packets encapsulating the PDUs to the target device 130. The NIC 116 is also configured to receive transport packets from the network 150, to de-capsulate PDUs included in the transport packets, and write data included on the PDUs to the application memory 114 via the interface between the NIC 116 and the application memory 114. In an embodiment, the PDUs generated by the NIC 116 conform to a data storage over fabric communication protocol, such as NVMe/TCP protocol. In an embodiment, the transport packets that encapsulate the PDUs conform to a transport protocol supported by the network 150, such as TCP.

In an embodiment, the NIC 116 includes a processor, such as a media access control (MAC) processor (not shown) coupled to the network 150. In an embodiment, the NIC 116 additionally includes one or more offload engines (not shown), such as an NVMe/TCP offload engine and a TCP offload engine configured to perform operations for processing corresponding respective layers of the packets received from the network 150 or to be transmitted on the network 150.

The NIC 116 includes a protocol alignment controller 117 and a network diagnostics processor 118, in an embodiment. The protocol alignment controller 117 is configured to align PDUs that conform to the data storage communication protocol, such as NVMe/TCP PDUs, with transport packets that conform to the transport protocol, such as TCP packets, in an embodiment. The protocol alignment controller 117 is configured to ensure that one or more complete NVMe/TCP PDUs are encapsulated in each TCP packet. For example, the protocol alignment controller 117 is configured to segment the data stream received from the processor 112 for layering over TCP such that only complete NVMe/TCP PDUs will be encapsulated in each TCP packet (also referred to herein as "TCP segment"). The protocol alignment controller 117 is also configured to receive PDUs that are aligned with transport packets, and to place data included in the PDUs directly to the application memory 114 based in data placement information included in headers of the PDUs, even when the transport packets are received out of order at the host device 110, in an embodiment.

In an embodiment, the protocol alignment controller 117 is configured to negotiate the use of alignment mode for transmission of one or more data streams from the host device 110 to the target device 130, and to enable the alignment mode for transmission of the one or more data streams only after the use of alignment mode for transmission is negotiated between the host device 110 to the target device 130. Negotiation of the use of alignment mode is based on network diagnostics measurements on the network 150 performed by the network diagnostics processor 118, in an embodiment. Negotiation of the use of alignment mode, according to an embodiment, is described in more detail below in connection with FIG. 5.

In an embodiment, the NIC 116 is coupled to an out of order (OOO) buffer 120. In an embodiment, the NIC 116 is configured to temporarily store out of order transport packets in the OOO buffer 120 in some situations. In an embodiment, an OOO transport packet written to the OOO buffer 120 by the NIC 116 is stored in the OOO buffer 120 until missing transport packet (or missing transport packets) that precede the OOO transport packet in a sequence of transport packets being transmitted to the host device 110 are received by the host device 112. When the missing transport packet (or missing transport packets) are received by the host device 110, the NIC 116 re-assembles the sequence of transport packets in the correct order, identifies final memory locations in the application memory 114 for storing data included in the transport packets, and transfers the data to the determined final memory locations in the application memory 114, in an embodiment. In an embodiment, the NIC 116 is configured to temporarily store out of order transport packets in the OOO buffer 150 for connections for which the alignment mode is not enabled for transmissions by the target device 130, in an embodiment In some embodiments, the OOO buffer 120 is omitted from the host device 110.

In various embodiments, the processor 112 of the host device 110 is a central processing unit (CPU) or microprocessor having one or more cores or processing engines, coupled to the application memory 114 and configured to access the application memory 114 for executing one or more applications on the host device 110. Although only a single processor 111 is shown in FIG. 1, in other embodiments, the host device 110 includes two, three, or more processors. In an embodiment, the host device 110 includes additional processors (not shown) that access the application memory 114, such as graphical processing units (GPUs), parallel processors, application specific integrated circuits (ASICs), or other suitable processing devices. The application memory 114 is an application memory for storing application data, operating system data, or other suitable data, for example, random access memory (RAM) module or other suitable memory device, in various embodiments. Although only a single application memory 114 is shown, the host device 110 includes two, three, four, or more RAM modules, in other embodiments.

Figure 2A:
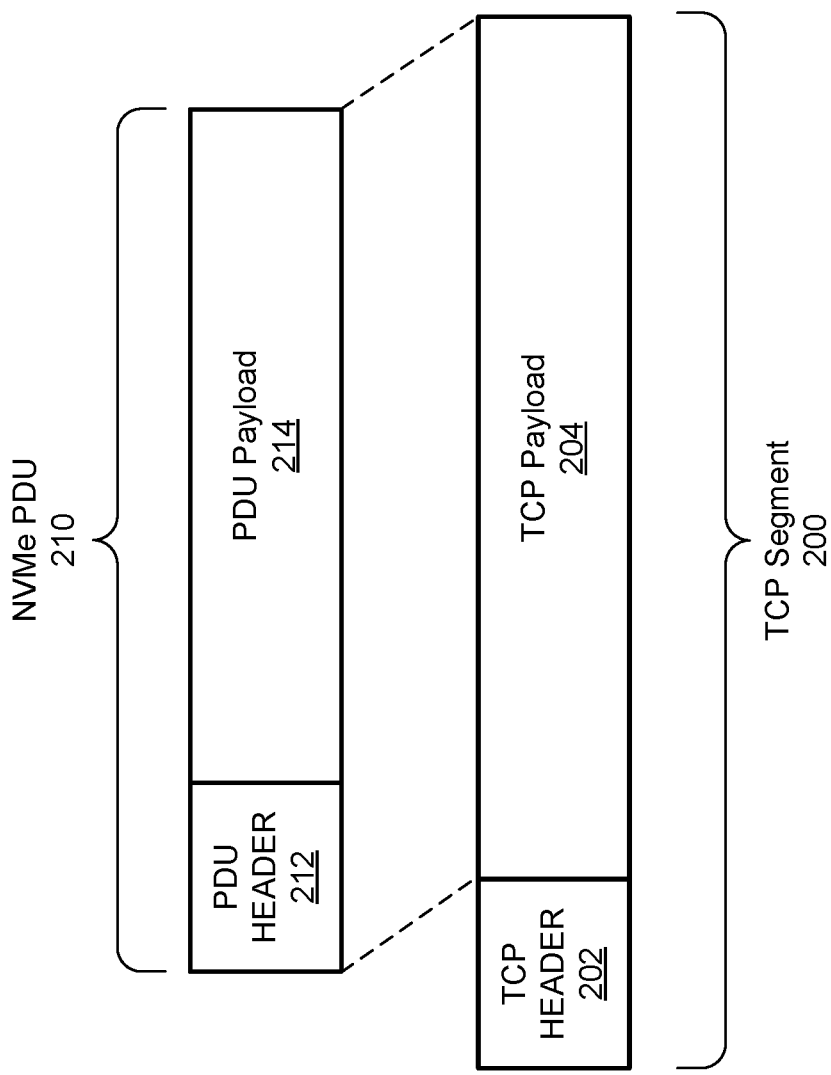
FIGS. 2A-2B are diagrams of example transport protocol packets that encapsulate one or more data storage protocol data units for transmission over a network in an aligned manner in the system of FIG. 1, according to an embodiment.
Figure 2B:
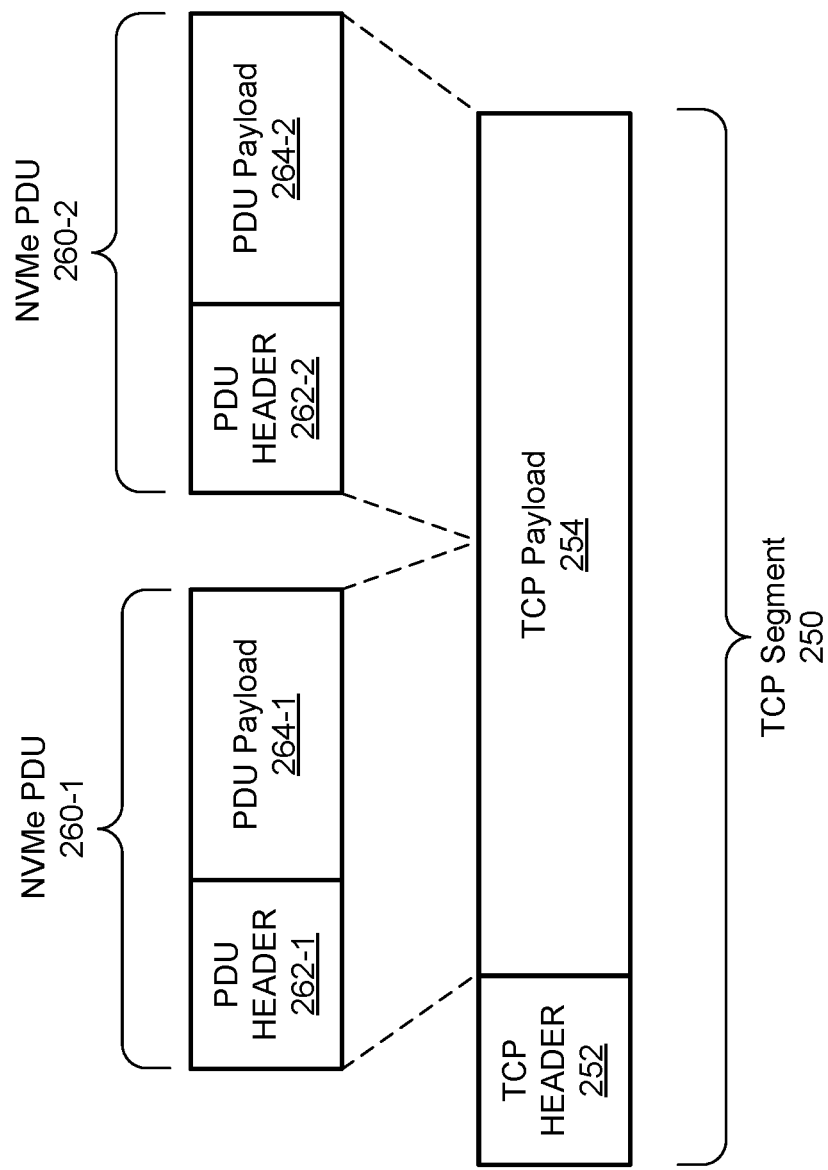

FIGS. 2A-2B are diagrams of example transport protocol packets 200, 250 that encapsulate one or more data storage PDUs for transmission over a network in an aligned manner, according to an embodiment. In an embodiment, the transport protocol packets 200, 250 correspond to TCP segments, and the transport protocol packets 200, 250 are sometimes referred to herein as TCP segments 200, 250. In an embodiment, the one or more data storage PDUs encapsulated in the transport protocol packets 200, 250 correspond to NVMe/TCP PDUs, and the one or more data storage PDUs are sometimes referred to herein as NVMe/TCP PDUs. In other embodiments, the transport protocol packets 200, 250 are transport packets different from TCP segments and/or the one or more data storage PDUs are PDUs different from NVMe/TCP PDUs.

In an embodiment, the NIC 116 (e.g., the protocol alignment controller 117) of the host device 110 of FIG. 1 is configured to generate a sequence of one or more transport packets, including one or more transport packets 200 of FIG. 2A and/or one or more transport packets 250 of FIG. 2B, and to transmit the sequence of transport packets to the target device 130 when the host device 110 and the target device 130 are operating in alignment mode for transmission of data associated with one or more data streams from the host device 110 to the target device 130. In an embodiment, the NIC 116 (e.g., the protocol alignment controller 117) of the host device 110 of FIG. 1 is configured to receive a sequence of one or more transport packets, including one or more transport packets 200 of FIG. 2A and/or one or more transport packets 250 of FIG. 2B, from the target device 130 when the host device 110 and the target device 130 are operating in alignment mode for transmission of data associated with one or more data streams from the target device 130 to the host device 110.

In an embodiment, the NIC 136 (e.g., the protocol alignment controller 137) of the target device 130 of FIG. 1 is configured to generate a sequence of one or more transport packets, including one or more transport packets 200 of FIG. 2A and/or one or more transport packets 250 of FIG. 2B, and to transmit the sequence transport packets to the host device 110 when the host device 110 and the target device 130 are operating in alignment mode for transmission of data associated with one or more data streams from the target device 130 to the host device 110. In an embodiment, the NIC 136 (e.g., the protocol alignment controller 137) of the target device 130 of FIG. 1 is configured to receive a sequence of one or more transport packets, including one or more transport packets 200 of FIG. 2A and/or one or more transport packets 250 of FIG. 2B, from the host device 110 when the target device 130 and the host device 110 are operating in alignment mode for transmission of data associated with one or more data streams from the host device 110 to the target device 130.

Referring first to FIG. 2A, the TCP segment 200 includes a TCP header 202 and a TCP payload 204. The TCP header includes a sequence number set to indicate an order of TCP segment 200 in a sequence of TCP segments 200. The TCP payload 204 includes an NVMe/TCP PDU 210. The NVMe/TCP PDU 210, in turn, includes a PDU header 212 and a PDU payload 214. The PDU payload 214 includes data associated with a data stream to be stored in a memory, such as the application memory 114 or the target memory 132 of FIG. 1, in an embodiment. In an embodiment, the TCP payload 204 of the TCP segment 204 includes a single NVMe/TCP PDU in its entirety. Accordingly, a beginning of the NVMe/TCP PDU (i.e., a beginning of the PDU header 212) is aligned with a beginning of the TCP payload 204, in this embodiment. In an embodiment, to ensure that the NVMe/TCP PDU 210 fits in its entirety in the TCP payload 204 of the TCP segment 200, the NIC controller 116 (or the NIC controller 136) generates the NVMe/TCP PDU 210 such that a size (e.g., length) of the NVMe/TCP PDU 210 does not exceed a TCP maximum segment size (MSS) being used for transmission of the TCP segment 200. The PDU header 212 includes an indication of the data stream with which the data included in the PDU payload 214 is associated and data placement information indicating placement of the data in the PDU payload 214 within the data stream, in an embodiment.

Because the PDU header 212 of the NVMe/TCP PDU 210 included in the TCP packet 200 is aligned with the beginning of the TCP payload 204 of the transport packet 200, a receiving device (e.g., the host device 110 or the target device 130) that receives the TCP packet 200 locates the PDU header 212 at the beginning of the TCP payload 204, and determines data placement information for data included in the PDU payload 214 of the NVMe/TCP PDU 210 even when the TCP packet 200 is received at the receiving device out of order within a sequence of packets transmitted to the receiving device, in an embodiment. Accordingly, the receiving device places the data directly into the memory (e.g., the application memory 114 or the target memory 132) at a memory location determined based on the data placement information in the PDU header 212, without temporarily storing the transport packet 200 in an OOO buffer, even when the transport packet 200 is received at the receiving device out of order within the sequence of packets transmitted to the receiving device, in an embodiment.

Referring now to FIG. 2B, the transport protocol packet 250 encapsulates multiple data storage PDUs in an aligned manner, according to an embodiment. The transport packet 250 corresponds to a TCP segment, in an embodiment. Accordingly, the transport packet 250 is sometimes referred to herein as a TCP segment 250. The TCP segment 250 is generally the same as the TCP segment 200 of FIG. 2A. The TCP segment 250 includes a TCP header 252 that generally corresponds to the TCP header 202 of FIG. 2A and a TCP payload 254 that generally corresponds to the TCP payload 204 of FIG. 2A. However, whereas the TCP payload 204 of FIG. 2A includes a single complete NVMe/TCP PDU 210, the TCP payload 254 includes multiple complete NVMe/TCP PDUs 260, in an embodiment. Although the TCP payload 254 is illustrated in FIG. 2 as including two complete NVMe/TCP PDUs 260, the TCP payload 254 includes other suitable numbers (e.g., three, four, five, etc.) of complete NVMe/TCP PDUs 260 in other embodiments.

In an embodiment, each of the NVMe/TCP PDUs 260 includes a respective PDU header 262 and a respective PDU payload 264. Each PDU payload 264 includes data associated with a data stream to be stored in a memory, such as the application memory 114 or the target memory 132 of FIG. 1, in an embodiment. In an embodiment, to ensure that the NVMe/TCP PDUs 260 fit entirety in the TCP payload 254 of the TCP segment 250, the NIC controller 116 (or the NIC controller 136) generates the NVMe/TCP PDUs 260 such that a collective size (e.g., length) of the NVMe/TCP PDUs 260 do not exceed a TCP maximum segment size (MSS) being used for transmission of the TCP segment 250. In an embodiment, each PDU header 262 includes an indication of the data stream with which the data included in the corresponding PDU payload 264 is associated and data placement information indicating placement of the data included in the corresponding PDU payload 264 within the corresponding data stream. In an embodiment, respective ones of the multiple NVMe/TCP PDUs 260 include respective data associated with different data streams. In another embodiment, at least some of the multiple NVMe/TCP PDUs 260 include respective data portions associated with a same data stream.

Because the PDU header 262-1 of the first NVMe/TCP PDU 260-1 included in the TCP packet 250 is aligned with the beginning of the TCP payload 254 of the transport packet 250, a receiving device (e.g., the host device 110 or the target device 130) that receives the TCP packet 250 locates the PDU header 262-1 at the beginning of the TCP payload 254, and obtains data placement information for data included in the PDU payload 264-1 of the first NVMe/TCP PDU 260-1 even when the TCP packet 250 is received at the receiving device out of order within a sequence of packets transmitted to the receiving device, in an embodiment. Additionally, the receiving device determines, based on a PDU length indicator included in the PDU header 262-1, a length of the first NVMe/TCP PDU 260-1 and, consequently, locates the PDU header 262-2 of the second NVMe/TCP PDU 260-2 by locating the end of the first NVMe/TCP PDU 260-1, in an embodiment. Based on the data placement information included in the PDU header 262-2, the receiving device determines a memory location for direct placement of the data included in the PDU payload 264-2 of the second NVMe/TCP PDU 260-2, in an embodiment. Accordingly, the receiving device places the data included in both the first NVMe/TCP PDU 260-1 and the second NVMe/TCP PDU 260-2 directly into the memory (e.g., the application memory 114 or the target memory 132) at respective memory locations determined based on the data placement information in the PDU headers 262-1 and 262-2, without temporarily storing the transport packet 250 in an OOO buffer, even when the transport packet 250 is received at the receiving device out of order within the sequence of packets transmitted to the receiving device, in an embodiment.

Figure 3:
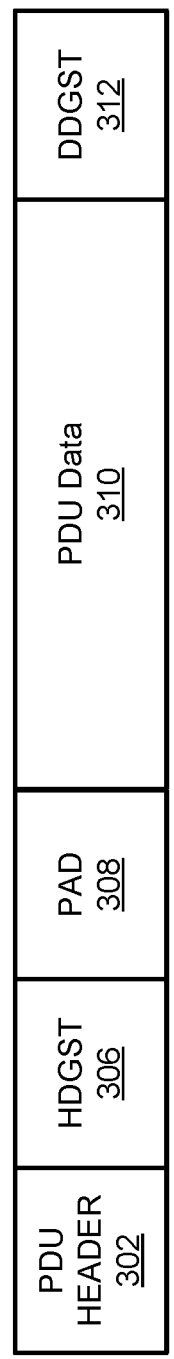
FIG. 3 is a diagram of an example protocol data unit that may be encapsulated in one of the transport protocol packets of FIGS. 2A-2B, according to an embodiment.

FIG. 3 is a diagram of an example PDU 300, according to an embodiment. In an embodiment, the PDU 300 corresponds to the NVMe/TCP PDU 210 of FIG. 2A. In another embodiment, the PDU 300 corresponds to each of the NVMe/TCP PDUs 250 of FIG. 2B. The PDU 300 includes a PDU header 302 that corresponds to the PDU header 212 of FIG. 2B and/or each of the PDU headers 262 in FIG. 2B, in various embodiments. The PDU 300 also includes a header digest field 306, one or more padding bits 308, a PDU data portion 310 and a data digest field 312, in the illustrated embodiment. The header digest field includes information that protects the PDU header 302 and enables a receiving device to verify validity of the PDU header 302. For example, the header digest field 312 includes a value calculated based on the PDU header 302 using a suitable algorithm, such as a cyclic redundancy check algorithm, that is known to the receiving device. Similarly, the data digest field includes information that protects the PDU data 310 and enables a receiving device to verify validity of the PDU data 310. For example, the data digest field 312 includes a value calculated based on the PDU data 310 using a suitable algorithm, such as a cyclic redundancy check algorithm, that is known to the receiving device.

In some embodiments or scenarios, the PDU 300 omits one or more of the header digest field 306, the padding bits 308, and the data digest field 312. For example, the use of the header digest field 306, the padding bits 308, and/or the data digest field 312 for transmission of data between the host device 110 and the target device 130 is negotiated prior to transmission of the PDU 300 from the host device 110 to the target device 130 or vice-versa, in an embodiment. In an embodiment, the use of the header digest field 306 is required when the PDU 300 is transmitted by the host device 110 or by the target device 130 using the alignment mode. Accordingly, when the transmitting device (e.g., the host device 110 or the target device 130) enables the alignment mode for transmission of data to a receiving device, the transmitting device automatically includes the header digest field 306 in PDUs transmitted from the transmitting device to the receiving device. Automatically including the header digest field 306 in PDUs transmitted from the transmitting device to the receiving device ensures that the receiving device will be able to verify validity of the PDU header located in a PDU received by the receiving device and to detect an error in case alignment between the PDU and a TCP payload of a TCP packet that encapsulates the PDU is broken, for example by an intermediate device in the network 150, in an embodiment.

FIGS. 4A-4B are diagrams of example PDU headers 400, 450 that include data placement information, according to an embodiment. In an embodiment and/or scenario, the PDU header 400 of FIG. 4A corresponds to the PDU header 302 of the PDU 300 of FIG. 3. In an embodiment and/or scenario, the PDU header 450 of FIG. 4B corresponds to the PDU header 302 of the PDU 300 of FIG. 3. For example, the PDU header 400 of FIG. 4A is used when the PDU 300 is a host to controller (H2C) data PPDU transmitted from the host device 110 to the target device 130, and the PDU header 450 of FIG. 4B is used when the PDU 300 is a controller to host (C2H) data PPDU transmitted from the target device 130 to the host device 110, in an embodiment. In embodiments, a receiving device (e.g., the host device 110 or the target device 130) is configured to use the data placement information in the PDU headers 400, 450 to determine a final memory location for writing corresponding data directly to the final memory location in a memory (e.g., the application memory 114 or the target memory 132) of the receiving device even if the transport packet that encapsulates the PDU is received OOO by the receiving device, at least when alignment mode is being used for transmission of the data to the receiving device.

Referring first to FIG. 4A, the PDU header 400 includes a plurality of fields including a command capsule CID (CCCID) field 402, a transfer tag (TTAG) field 404, a data offset (DATAO) field 406, a data length (DATAL) field 408 and a reserved field 410. The TTAG field 404 includes an identifier of a data stream with which data included in the PDU data portion 310 is associated, and the DATAO field 408 indicates an offset of the data from a beginning of an I/O data buffer associated with the data stream, in an embodiment. The DATAL field 408 indicates a length of the PDU 300, in an embodiment. The target device 130 determines a memory location, in the target memory 132, for placing the data included in the PDU data portion 310 based on the indication in the TTAG field 404 and the DATAO field 408, in an embodiment. For example, the target device 130 identifies, based on the TTAG field 404, a connection with which the data stream is associated and, based on the identified connection, determines a particular I/O buffer 140, from among the plurality of buffers 140 in the target memory 132, for example by mapping an NVMeOF I/O queue pair (QP) associated with the PDU 300 to the particular I/O buffer, in an embodiment. The target device 130 then determines, based on the DATAO field 408, an offset from a beginning of the identified I/O data buffer for placing the data into the identified I/O buffer in the target memory 132, in an embodiment.

Referring now to FIG. 4B, the PDU header 450 is generally the same as the PDU header 400 of FIG. 4A, except that in the PDU header 450 the TTAG field 404 is replaced with a reserved field 454, in an embodiment. In an embodiment, the host device 110 determines a memory location, in the application memory 114, for placing the data included in the PDU data portion 310 based on the indication in the CCCID field 402 and the DATAO field 408, in an embodiment. For example, the host device 110 identifies, based on the CCCID field 402, a connection with which the data stream is associated and, based on the identified connection, identifies a particular buffer, among a plurality of I/O data buffers in the application memory 114, for example by mapping an NVMeOF I/O queue pair (QP) associated with the PDU 300 to the particular I/O buffer, in an embodiment. The host device 110 then determines, based on the DATAO field 408, an offset from a beginning of the identified buffer for placing the data into the identified buffer in the application memory 114, in an embodiment.

Figure 5:
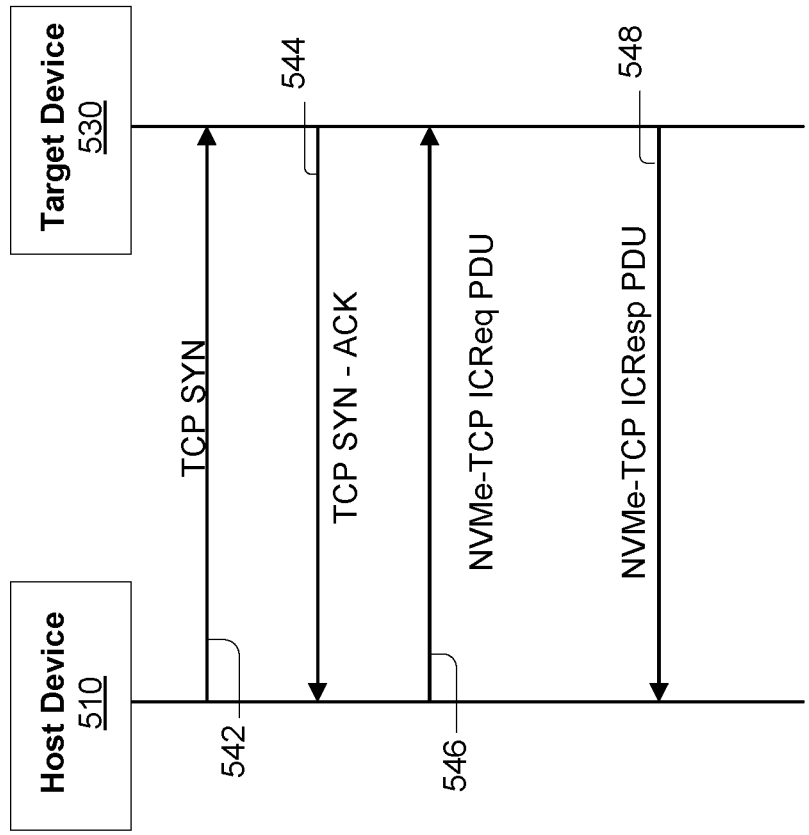
FIG. 5 is a diagram of a negotiation process for establishing a connection between a host device and a target device in the system of FIG. 1, according to an embodiment.

In embodiment, when (e.g., the host device 110 or the target device 130) receives a transport packet that includes data associated with a data stream and determines that the transport packet is an OOO packet, the receiving device (e.g., the NIC 116 of the host device 110 or the NIC 136 of the target device 130) performs one or more validations with respect to a PDU (e.g., the PDU 300) encapsulated in the transport packet prior to determining final memory locations based on direct placement data information included in a header of the PDU and writing the data directly to the final memory locations. For example, the receiving device performs validation of the PDU header based on header digest information included in the PDU, for example by performing a CRC calculation over the PDU header and comparing the calculated CRC to the value of a header digest field in the PDU. As another example, the receiving device validates a length of the PDU based on a data length indicator (e.g., the DATAL field 408) included in the PDU to ensure that the length of the PDU does not exceed the maximum segment size being utilized for the transmission. In an embodiment, if the one or more validations fail, then the receiving device writes the transport packet to an OOO buffer (e.g., the OOO buffer 120 or the OOO buffer 150) and disables the use of alignment mode for receiving subsequent transport packets in the sequence of transport packets corresponding to the data stream. The receiving device then handles processing of the transport packets associated with the data stream in the manner used when alignment mode is not utilized, without relying on alignment of PDUs with the transport packets, in an embodiment. FIG. 5 is a diagram of a negotiation process 500 for establishing a connection between a host device 510 and a target device 530, according to an embodiment. The host device 530 corresponds to the host device 110 of FIG. 1 and the target device 530 corresponds to the target device 130 of FIG. 1, in an embodiment. In the negotiation process 500, the host device 510 generates and transmits a TCP synchronization (TCP SYN) message 542 to the target device 530, in an embodiment. The TCP SYN message 542 initiates establishment of a TCP connection between the host device 510 and the target device 530, in an embodiment. The TCP SYN message 542 includes indications of one or more connection parameters (e.g., a sequence number), for example, in an embodiment. The target device 530 receives the TCP synch message 542 and generates and transmits a TCP SYN acknowledgement (TCP SYN ACK) message 544 to the host device 510 to acknowledge receipt of the TCP SYN message 542 from the host device 510, in an embodiment. Based on the exchange of the TCP SYN message 542 and TCP SYN ACK message 544, the host device 510 and the target device 530 determine a sequence number to be subsequently included in a first TCP packet transmitted over the established connection, in an embodiment.

The host device 510 then generates and transmits an initialize connection request message, such as a NVMe-TCP ICReq PDU 546, to the target device 530. The target device 530 receives and processes the NVMe-TCP ICReq PDU 546, and generates and transmits an initialize connection response message, such as a NVMe-TCP ICResp PDU 548, to the host device 530. The NVMe-TCP ICReq PDU 546 and the NVMe-TCP ICResp PDU 548 are used to establish a connection for data transfer between the host device 510 and the target device 530, and to exchange data transfer parameters, in an embodiment. In an embodiment, the NVMe-TCP ICReq PDU 546 and the NVMe-TCP ICResp PDU 548 are used to negotiate the use of the alignment mode on the established connection. The use of alignment mode is negotiated independently for each direction of data transmissions on the established connection, in an embodiment. For example, the NVMe-TCP ICReq PDU 546 from the host device 510 to the data target device 530 includes a first field that indicates whether or not the host device 510 is willing to perform data transmissions to the target devices 530 on the established connection in the alignment mode, and a second field set to indicate whether or not the host device 510 is requesting the target device 530 to perform data transmissions to the target devices 530 on the established connection in the alignment mode. In an embodiment, the host device 510 sets the first field in the NVMe-TCP ICReq PDU 546 based on network diagnostics (e.g., network diagnostics measured by a network diagnostics processor such as the network diagnostics processor 118). For example, if network measurements performed by the network diagnostics processor 118 indicate that the network 150 is currently lossy in the direction from the host device 510 to the target device 530, then the host device 510 initiates a connection re-establishment procedure and, in the connection re-establishment procedure, sets the first field in the NVMe-TCP ICReq PDU 546 to indicate that the host device 520 is willing to transmit data to the target device 530 using the alignment mode, in an embodiment.

In an embodiment, the NVMe-TCP ICResp PDU 548 includes a first field that indicates whether or not the target device 530 is accepting a request of the host device 510 to perform data transmissions to the host device 510 on the established connection in the alignment mode, and a second field set to indicate whether or not the target device 530 is requesting the host device 510 to perform data transmissions to the target devices 530 on the established connection in the alignment mode. In an embodiment, the target devices 530 sets the second field in the NVMe-TCP ICResp PDU 548 based on network conditions (e.g., network diagnostics measured by a network diagnostics processor such as the network diagnostics processor 138). For example, if network measurements performed by the network diagnostics processor 138 indicate that the communication link being used for the TCP connection on network 150 is currently lossy in the direction from the host device 510 to the target device 530, then the target device 530 sets the second field in the NVMe-TCP ICResp PDU 548 during a connection re-establishment procedure to indicate that the target device 530 is requesting the host device 510 to perform transmissions to the target device 530 using the alignment mode, in an embodiment.

In an embodiment, in response to transmitting the NVMe-TCP ICReq PDU 546 that includes the indication that the host device 510 is willing to transmit data to the target device 530 using the alignment mode and receiving the NVMe-TCP ICResp PDU 548 that includes the indication that the target device 530 is requesting that the host device 510 transmits data to the target device 530, the host device 510 enables the alignment mode for transmission of data on the established connection to the target device 530, in an embodiment. Similarly, in response to receiving the NVMe-TCP ICReq PDU 546 that includes the indication that the host device 510 is requesting that the target device 530 utilize the alignment mode for transmission of data to the host device 510 and transmitting the NVMe-TCP ICResp PDU 548 that includes the indication that the target device 530 accepts the request, the target device 530 enables the alignment mode for transmission of data on the established connection to the host device 510, in an embodiment.

In an embodiment, when alignment mode is enabled for transmission of data to a receiving device (e.g., the host device 110 or the target device 130), the receiving device (e.g., the NIC 116 of the host device 110 or the NIC 136 of the target device 130) disables one or more validations that the receiving device is configured to perform when alignment mode is not utilized for transmission to the receiving device. For example, the receiving device disables a non-contiguous PDU (e.g., non-contiguous H2CData PDU or non-contiguous C2HData PDU) reception validation and/or a last PDU in a data stream validation, in an embodiment. Accordingly, the one or more validations that the receiving device is configured to perform when alignment mode is not utilized for transmission to the receiving device are not performed by the receiving device when alignment mode is used for transmission of data to the receiving device, in an embodiment.

Figure 6:
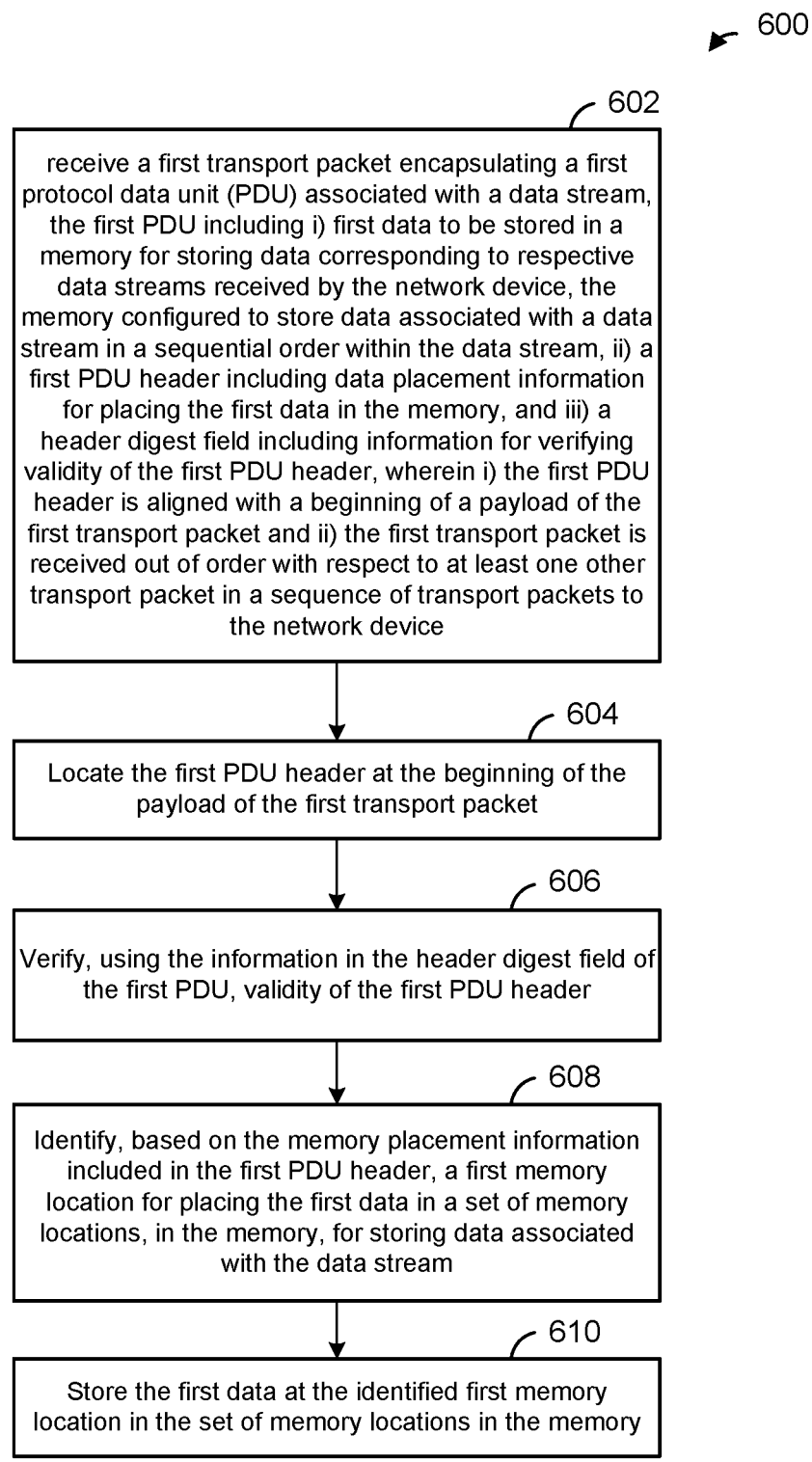
FIG. 6 is a flow diagram of an example method implemented in the system of FIG. 1 for placing received data into a memory of a network device, according to an embodiment.

FIG. 6 is a flow diagram of an example method 600 for placing received data into a memory of a network device, according to an embodiment. In an embodiment, the method 600 is implemented by the host device 110 (e.g., the protocol alignment controller 117) or the target device 130 (e.g., the protocol alignment controller 137) of FIG. 1. For ease of explanation, the method 600 is described below in the context of placing data received by the target device 130 into the memory 132 of the target device 132. In another embodiment, the method 600 is implemented by the host device 110 to place data received by the host device 110 into the application memory 114 of the host device 114. In other embodiments, the method 600 is implemented by suitable network devices different from the host device 110 and/or the target device 130 of FIG. 1.

At block 602, the target device 130 receives a first transport packet encapsulating a PDU associated with a data stream transmitted from the host device 110 to the target device 130. In an embodiment, the first PDU includes i) first data to be stored in the target memory 132 of the target device 130 configured to store data corresponding to respective data streams received by the target device 130. In an embodiment, the target memory 132 is configured to store data associated with a respective data stream received by the target device 130 in a sequential order within the respective data stream. The first PDU also includes a first PDU header including data placement information for placing the first data in the target memory 132, and a header digest field including information for verifying validity of the first PDU header. In an embodiment, the first PDU header in the received PDU is aligned with a beginning of a payload of the first transport packet. In an embodiment, the first transport packet is received out of order with respect to at least one other transport packet in a sequence of transport packets to the network device.

At block 604, the target device 130 locates the first PDU header of the first PDU at the beginning of the payload of the first transport packet. The target device 130 also locates the header digest information in the first PDU, in an embodiment. For example, the target device 130 locates a header digest field that immediately follows the first PDU header in the first PDU, in an embodiment.

At block 606, the target device 130 verifies, using the information in the header digest field of the first PDU, validity of the first PDU header. For example, the target device 130 performs a calculation (e.g., a CRC calculation) over bits in the first PDU header, and compares the calculated value with a value included in the header digest field that immediately follows the first PDU header, in an embodiment. In an embodiment, when the target device 130 determines that the first PDU header is valid, the target device 130 thereby verifies alignment of the first PDU header with the beginning of the payload of the first transport packet.

At block 608, the target device 130 identifies, based on the memory placement information included in the first PDU header, a first memory location for placing the first data in a set of memory locations, in the memory 132, for storing data associated with the data stream. In an embodiment, the target device 130 performs block 608 in response to determining that the first PDU header is valid at block 606.

At block 610, the target device 130 stores the first data by writing the first data beginning at the identified first memory location in the set of memory locations in the target memory 132. Accordingly, the first data is placed directly into a proper memory location in the target memory 132 even though the transport packet was received out of order by the target device 130, in an embodiment.

Figure 7:
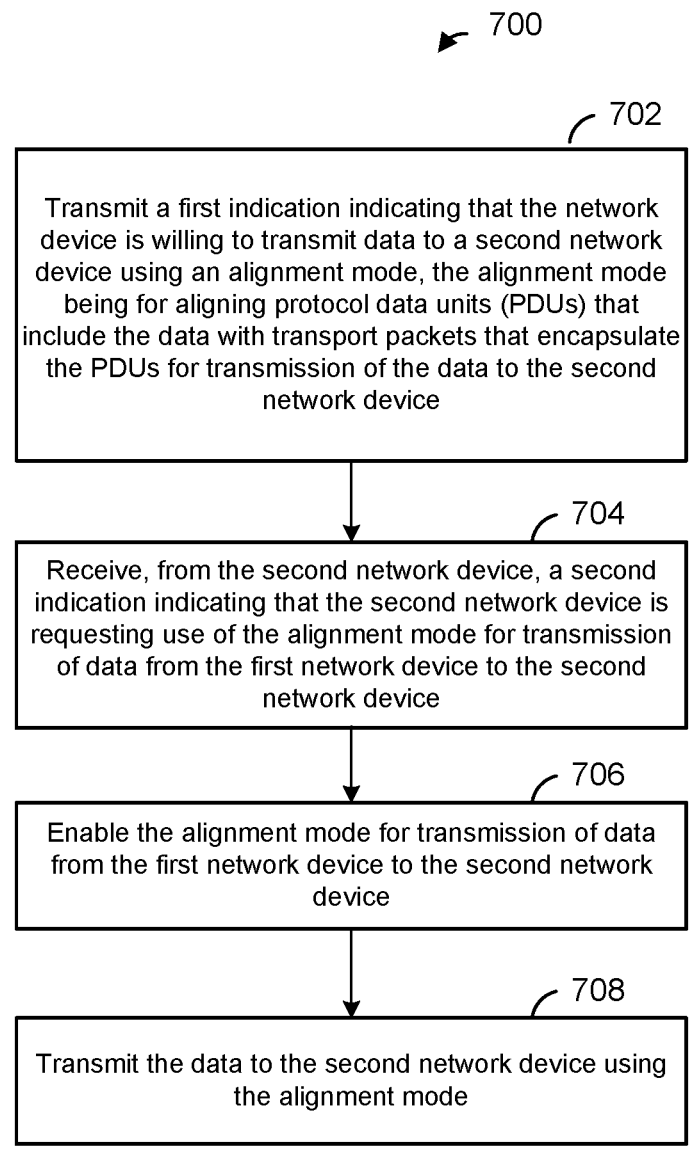
FIG. 7 is a flow diagram of an example method implemented in the system of FIG. 1 for negotiation of the use of an alignment mode, according to an embodiment.

FIG. 7 is a flow diagram of an example method 700 for negotiation of the use of an alignment mode, according to an embodiment. In an embodiment, the method 700 is implemented by the host device 110 (e.g., the protocol alignment controller 117) or the target device 130 (e.g., the protocol alignment controller 137) of FIG. 1. For ease of explanation, the method 700 is described below in the context of alignment mode negotiation between the host device 110 and the target device 130 of FIG. 1. In other embodiments, the method 700 is implemented by suitable network devices different from the host device 110 and/or the target device 130 of FIG. 1.

At block 702, the host device 110 transmits a first indication to the target device 130. The first indicates that that the host device 110 is willing to transmit data to the target device 130 using an alignment mode for aligning PDUs that include the data with transport packets that encapsulate the PDUs for transmission of the data to the target device 130. In an embodiment, the host device 110 includes the first indication in a first field of a connection request message, such as the NVMe-TCP ICReq PDU 546 of FIG. 5, that the host device 110 transits to the target device 130. In another embodiment, the host device 110 transmits the first indication to the target device 130 in another suitable manner.

At block 704, the host device 110 receives a second indication from the target device 130. The second indication indicates that the target device 130 is requesting use of the alignment mode for transmission of data from the first network device to the second network device In an embodiment, second indication is included in a first field of a connection response message, such as the NVMe-TCP ICResp PDU 548 of FIG. 5, that the host device 110 receives from to the target device 130. In another embodiment, the host device 110 receives the second indication from the target device 130 in another suitable manner.

At block 706, in response to transmitting the first indication to the target device 130 and receiving the second indication from the target device 130, the host device 110 enables the alignment mode for transmission of data from the first network device to the target device 130. At block 708, the host device 110 transmits the data to the second network device using the alignment mode. In an embodiment, the data is to be written to the target memory 132 of the target device 130.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention. For example, one or more portions of methods or techniques described above may be performed in a different order (or concurrently) and still achieve desirable results.

What is claimed is:

1. A first network device, comprising:
    a memory for storing data associated with one or more data streams one or both of i) received by the first network device and ii) to be transmitted by the first network device, the memory configured to store data associated with a respective data stream in a sequential order within the respective data stream; and
    a network interface controller having one or more integrated circuits configured to
        transmit, to a second network device, a first indication indicating that the first network device is willing to transmit data retrieved from the memory to the second network device using an alignment mode, the alignment mode being for aligning protocol data units (PDUs) that include data retrieved from the memory with transport packets that encapsulate at least i) the PDUs for transmission of the data to the second network device and ii) information for direct placement of the corresponding data in a memory of the second network device;
        receive, from the second network device, a second indication indicating that the second network device is requesting use of the alignment mode for transmission of data from the first network device to the second network device;
        in response to transmitting the first indication to the second network device and receiving the second indication from the second network device, enable the alignment mode for transmission of data from the first network device to the second network device; and
        transmit the data retrieved from the memory to the second network device using the alignment mode.

2. The first network device of claim 1, wherein the one or more integrated circuits are further configured to
    transmit, to the second network device, a third indication indicating that the first network device is requesting use of the alignment mode for transmission of data to be stored in the memory from the second network device;
    receive, from the second network device, a fourth indication indicating that the second network device is accepting use of the alignment mode for transmission of data to be stored in the memory from the second network device; and
    in response to transmitting the third indication to the second network device and receiving the fourth indication from the second network device, enable the alignment mode for reception of data from the second network device.

3. The first network device of claim 1, wherein the one or more integrated circuits are further configured to
    generate a message to be transmitted to the second network device, the one or more integrated circuits configured to generate the first message to include the first indication in a first field of the message, and include the third indication in a second field of the message, and
    transmit the message to the second network device.

4. The first network device of claim 3, wherein the one or more integrated circuits are configured to generate the message at least by generating a connection initiation request message for establishing a connection for between the first communication device and the second communication device.

5. The first network device of claim 2, wherein the one or more integrated circuits are configured to receive the second indication and the fourth indication from the second network device at least by
    receiving a first field of a message from the second network device to the first network device, wherein the first field includes the second indication, and
    receiving a second field of the message from the second network device to the first network device, wherein the second field includes the fourth indication.

6. The first network device of claim 5, wherein the one or more integrated circuits are configured to receive the second indication and the fourth indication at least by receiving a connection initiation response message for establishing a connection between the first communication device and the second communication device.

7. The network device of claim 1, wherein the one or more integrated circuits are further configured to, in connection with enabling the alignment mode, automatically enable header verification mode, the header verification mode for including, in each of the one or more PDUs subsequently transmitted to the second network device, verification information to enable verification of validity of a respective PDU header of each of the one or more PDUs at the second network device.

8. The network device of claim 1, wherein the one or more integrated circuits are configured to transmit the data retrieved from the memory to the second network device using the alignment mode at least by transmitting one or more transport packet that encapsulate the data, wherein the one or more the transport packets conform to a transmission control protocol (TCP).

9. The network device of claim 8, wherein the one or more integrated circuits are configured to transmit the data retrieved from the memory to the second network device using the alignment mode at least by transmitting the one or more transport packet that encapsulate one or more PDUs that conform to a non-volatile memory express (NVMe) over transmission control protocol (TCP) protocol.

10. The network device of claim 1, wherein the memory comprises one of i) a target memory or ii) an application memory.

11. A method for alignment mode negotiation, the method comprising:
   transmitting, from a first network device to a second network device, a first indication indicating that the first network device is willing to transmit data to the second network device using an alignment mode, the alignment mode being for aligning protocol data units (PDUs) that include data with transport packets that encapsulate at least i) the PDUs for transmission of the data to the second network device and ii) information for direct placement of the corresponding data in a memory of the second network device;
   receiving, at the first network device from the second network device, a second indication indicating that the second network device is requesting use of the alignment mode for transmission of data from the first network device to the second network device;
   in response to transmitting the first indication to the second network device and receiving the second indication from the second network device, enabling the alignment mode for transmission of data from the first network device to the second network device; and
   transmitting, by the first network device, the data to the second network device using the alignment mode, the data to be written to a memory of the second network device.

12. The method of claim 11, further comprising
   transmitting, from the first network device to a second network device, a third indication indicating that the first network device is requesting use of the alignment mode for transmission of data from the second network device to the first network device;
   receiving, at the first network device from the second network device, a fourth indication indicating that the second network device is accepting use of the alignment mode for transmission of data from the second network device to the first network device;
   in response to transmitting the third indication to the second network device and receiving the fourth indication from the second network device, enabling the alignment mode for reception of data from the second network device.

13. The method of claim 12, wherein transmitting the first indication and transmitting the third indication comprises
   generating a message for transmission to the second network device, including generating the message to include i) the first indication in a first field of the message ii) the third indication in a second field of the message, and
   transmitting the message to the second network device.

14. The method of claim 13, wherein generating the message comprises generating a connection initiation request message for establishing a connection between the first communication device and the second communication device.

15. The method of claim 12, wherein
   receiving the second indication comprises receiving a first field of a message from the second network device to the first network device, wherein the first field includes the second indication, and
   receiving the fourth indication comprises receiving a second field of the message from the second network device to the first network device, wherein the second field includes the fourth indication.

16. The method of claim 15, wherein
   receiving the first field of the message comprises receiving a first field of a connection initiation response message for establishing a connection between the first communication device and the second communication device, and
   receiving the second field of the message comprises receiving a second field of the connection initiation response message for establishing the connection between the first communication device and the second communication device.

17. The method of claim 11, further comprising, in connection with enabling the alignment mode, automatically enabling header verification mode, the header verification mode for including, in each of the one or more PDUs subsequently transmitted to the second network device, verification information to enable verification of validity of a respective PDU header of each of the one or more PDUs at the second network device.

18. The method of claim 11, wherein transmitting the data to the second network device using the alignment mode comprises transmitting one or more transport packet that encapsulate the data, wherein the one or more the transport packets conform to a transmission control protocol (TCP).

19. The method of claim 18, transmitting the data to the second network device using the alignment mode comprises by transmitting the one or more transport packet that encapsulate one or more PDUs that conform to a non-volatile memory express (NVMe) over transmission control protocol (TCP) protocol.

20. The method of claim 11, wherein transmitting the data to the second network device using the alignment mode comprises transmitting the data to be written to one of i) a target memory of the second network device or ii) an application memory of the second network device.

* * * * *